Sept. 29, 1936.  C. A. CAMPBELL  2,055,966
AIR BRAKE
Original Filed Feb. 12, 1932   3 Sheets-Sheet 1
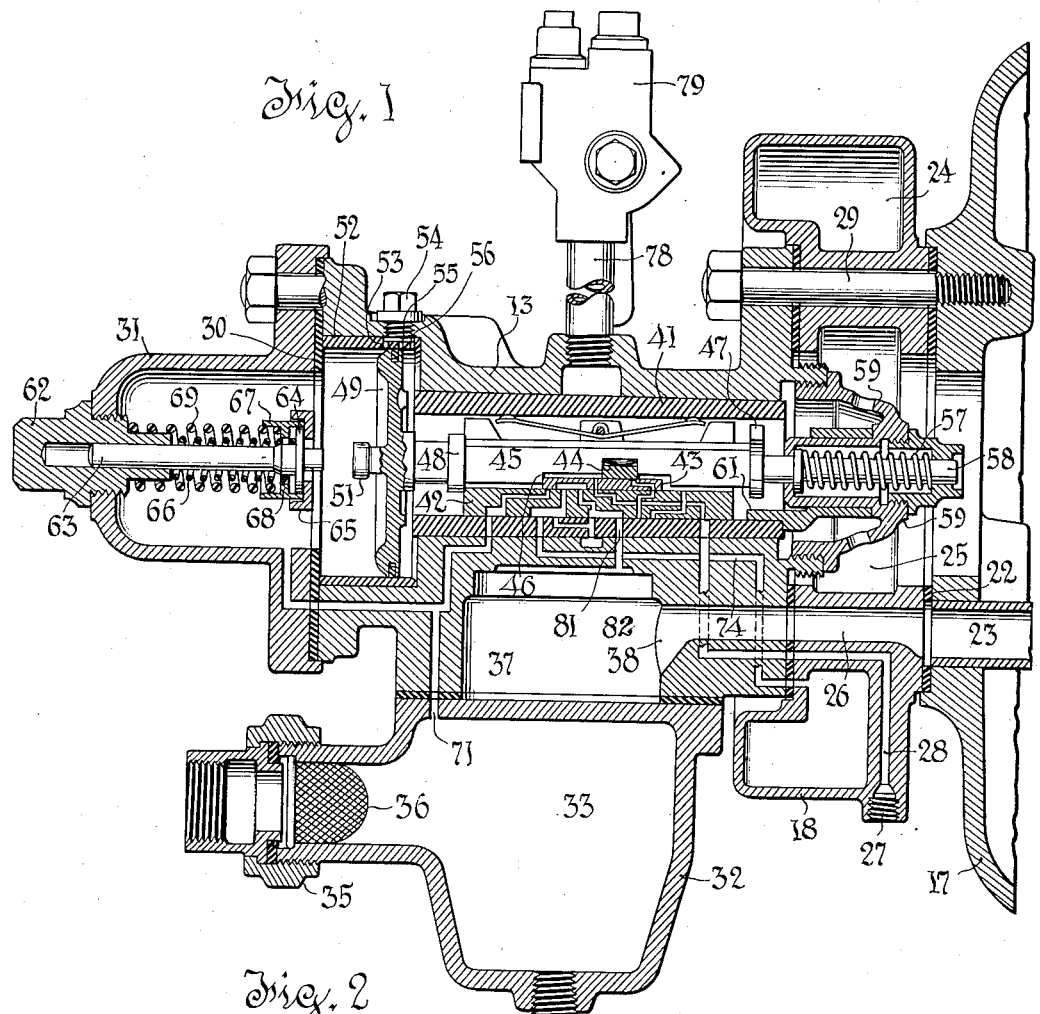
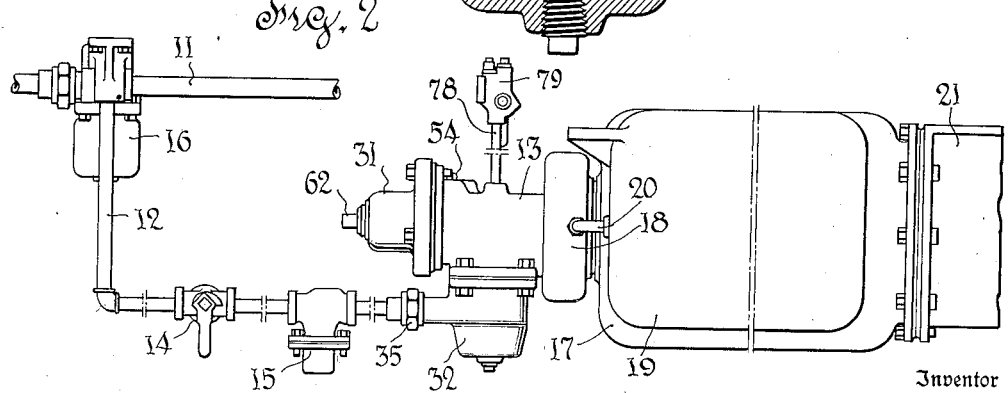
Inventor
Charles A. Campbell
By
Dodge and Ims
Attorneys

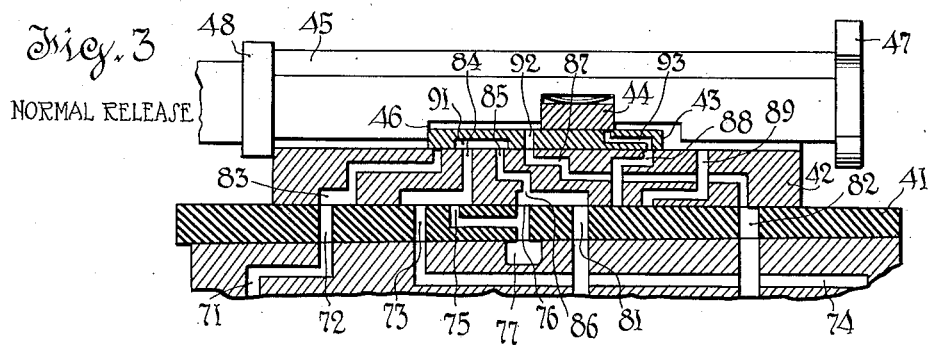
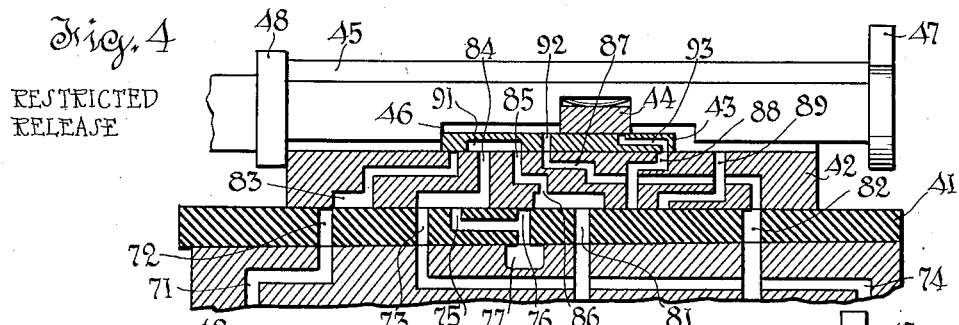
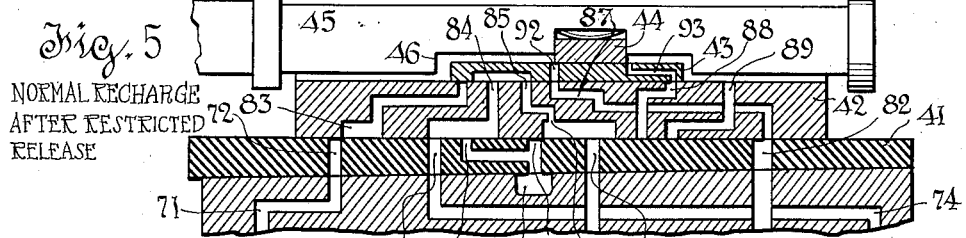
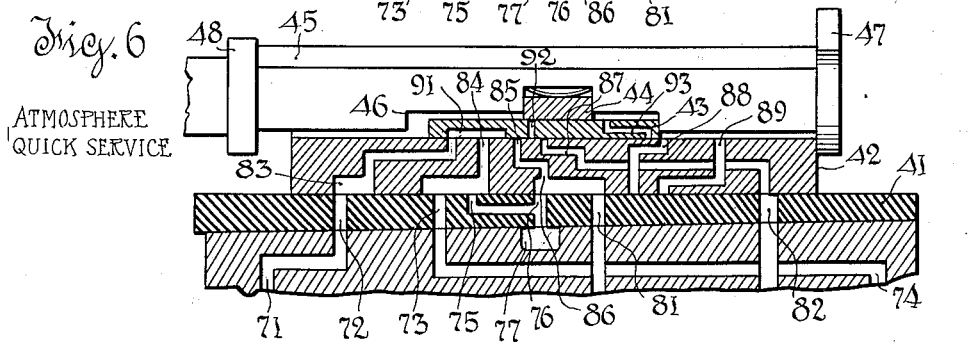

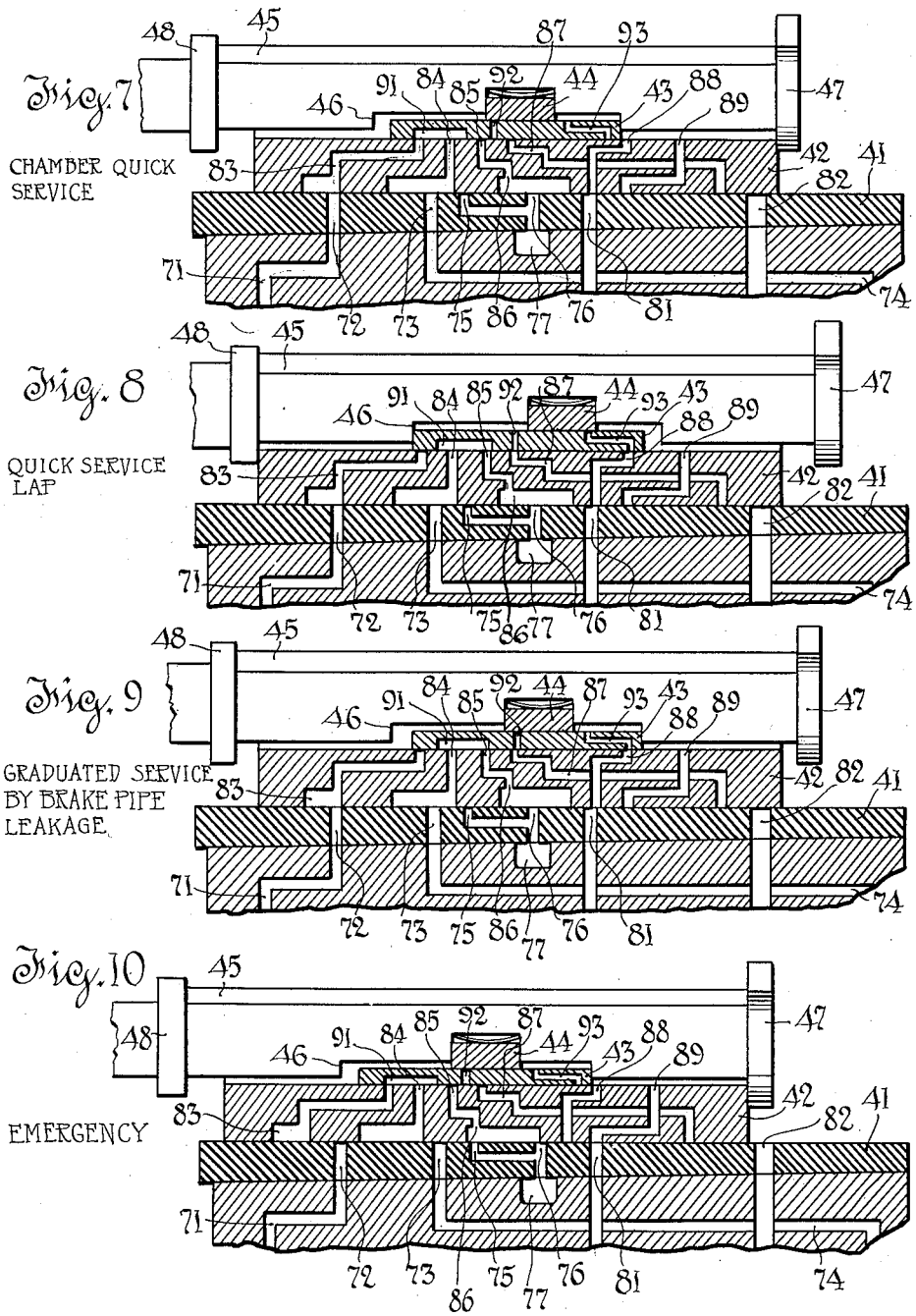

Patented Sept. 29, 1936

2,055,966

UNITED STATES PATENT OFFICE 2,055,966

AIR BRAKE

Charles A. Campbell, Watertown, N. Y., assignor to The New York Air Brake Company, a corporation of New Jersey Application February 12, 1932, Serial No. 592,641
Renewed July 7, 1936

37 Claims. (Cl. 303—35)

This invention relates to triple valves, particularly to triple valves having a quick service venting action.

The invention will be described as embodied in that type of triple valve which controls the charging of two reservoirs, an auxiliary reservoir and a supplemental reservoir, and which in service applications draws on the auxiliary reservoir alone and in emergency applications draws on both reservoirs. The particular valve illustrated has no emergency brake pipe venting function, this function being taken care of by a separate brake pipe vent valve.

While the structure chosen for illustration is in line with the present trend of the art, and is selected for that reason, the invention is not limited to use with this particular type of valve, but may be embodied in other known types regardless of the number of reservoirs and of the character of emergency venting.

From the mechanical standpoint the present triple valve differs from conventional valves in the interposition between a triple slide valve and a graduating valve, of a quick service controlling valve. As embodied for description herein the graduating valve is positively actuated by the triple piston, and the quick service controlling valve and triple slide valve have different degrees of lost motion relatively to such piston.

From the mechanical standpoint, another important characteristic is that the valve is equipped with two quick service vents. That vent which acts first, as the valve starts toward service position, is an atmospheric vent, and the second to act is a vent into a measuring chamber.

The action of the first, or atmospheric vent, assists the triple valve to move to the second or closed chamber venting position at which service flow commences. The duration of atmospheric venting is dependent on the local effectiveness of such venting to reduce brake pipe pressure. At the front and at the rear of long trains atmospheric venting is of short duration, but at the middle of long trains atmospheric venting will commonly persist as a result of the forward flow of air from the rear of the brake pipe and the consequent tendency to maintain brake pipe pressure. Thus atmospheric venting gives flexibility to meet the local requirement for venting.

When the chamber venting occurs, the rise of pressure in the measuring chamber causes a gradual termination of venting flow. This is favorable to the suppression of wave action in the brake pipe. Thus initial venting is active and persists until brake pipe pressure is reduced. Then the venting flow gradually reduces and terminates.

Furthermore, the device is so contrived that in succeeding reductions of brake pipe pressure, initiated at the engineer's brake valve, only chamber venting will take place, the chamber being vented to atmosphere in lap position. From this it follows that quick service is secured in successive reductions, but is less intense after the first reduction, because of the absence of atmospheric venting.

This type of quick service venting is superior to that in which the vented air is always fed to the brake cylinder, because brake cylinder pressure is not affected. The device is, however, so contrived that when operating with retainers, air vented in quick service flows to the brake cylinder, and after the initial brake pipe reduction the rate of quick service venting is reduced below the normal amount. In lap position, with retainers applied, the air from the measuring chamber is availed of to assist in making up any deficiency of brake cylinder pressure below the retained value. This result is secured by causing the atmospheric venting flow to occur through the exhaust port of the triple valve, to which the retainer is applied, and by causing the measuring chamber to be vented through this exhaust port when the triple valve is in lap position.

The various results above enumerated are secured by the porting and arrangement of the slide valves. No ancillary valve mechanism for controlling quick service venting is required.

The preferred embodiment of the invention is illustrated in the accompanying drawings, in which,—

Fig. 1 is a vertical axial section through a triple valve embodying the invention, the valve being shown in normal release and recharge position, and connected to an auxiliary reservoir.

Fig. 2 is a piping diagram showing the relation of the triple valve to the brake cylinder, the reservoirs, the brake pipe, and the brake pipe vent valve.

Fig. 3 is an enlarged section of the triple slide valve seat, triple slide valve, quick service controlling valve, and graduating valve, in normal recharge and release position.

Fig. 4 is a similar view showing the parts in restricted recharge and release position.

Fig. 5 is a similar view showing the parts in the position of normal recharge following restricted release.

Fig. 6 is a similar view showing the parts in atmospheric quick service position.

Fig. 7 is a similar view showing the parts in chamber quick service position.

Fig. 8 is a similar view showing the parts in quick service lap position.

Fig. 9 is a similar view showing the parts in a graduated service position induced by a very slow reduction of brake pipe pressure such as that caused by brake pipe leakage.

Fig. 10 is a similar view showing the parts in emergency position.

In Fig. 1 and in Figs. 3 to 10 inclusive, the showing is diagrammatic to the extent that the ports are all drawn as if they lay in a single plane of section. In actual practice greater compactness may be secured by arranging the ports in different planes without change of operative function.

Referring first to Fig. 2.

11 represents a portion of the brake pipe and 12 represents a branch pipe leading to the triple valve, indicated generally by the numeral 13 applied to its body. A cutout cock 14 and air cleaner 15 are interposed in the branch pipe in the order stated. An emergency brake pipe vent valve is indicated at 16, and, preferably, is mounted closely to the junction of the brake pipe and branch pipe, though its location is not important to the present invention. It functions only upon reduction of brake pipe pressure at an emergency rate, and then vents the brake pipe to atmosphere.

The triple valve body 13 is mounted on the rear end of an ordinary freight type auxiliary reservoir 17, the filler piece 18, which will be hereinafter described, being interposed between the body 13 and the reservoir 17 and affording connection for a pipe 20 leading from the supplemental reservoir 19.

As is usual in freight brakes, the brake cylinder 21 is mounted on the forward end of the auxiliary reservoir 17 and is connected through the reservoir to the mounting face 22 (see Fig. 1) on the rear end thereof by means of the brake cylinder pipe 23.

Referring now particularly to Fig. 1, the filler piece, indicated generally by the numeral 18, is provided with an annular chamber 24 which is the measuring chamber for quick service venting. This chamber surrounds a passage 25 which communicates with the auxiliary reservoir opening at the center of the mounting face 22 and also communicates with the interior of the slide valve chamber bushing, hereinafter described as mounted in the body 13 of the triple valve. The filler piece 18 is also provided with a through passage 26 which alines with the brake cylinder pipe 23 and with the brake cylinder port of the triple valve, as will be described.

The connection 27 is that to which the supplemental reservoir pipe 20 is attached, and leads to a port 28 which extends through the body 13 and communicates with a corresponding port in the triple slide valve seat. The body 13, filler piece 18, and auxiliary reservoir 17, are held together by studs 29. These are similar to the studs used in mounting triple valves on auxiliary reservoirs, but are longer to accommodate the filler piece.

The body 13 is illustrated as corresponding to the body of the well known K type triple valve. Mounted on the front end thereof is a front cap 31, and mounted on the lower side of the body 13 is a lower case 32 which takes the place of the lower case used in the K triple valve and which, in such valve, houses portions of the emergency valve.

The chamber 33 serves as a drip cup and is connected through the usual union 35 and strainer 36 with the brake pipe branch 12. Chamber 33 is isolated from the chamber 37, which is the chamber normally housing the emergency valve piston. Chamber 37 is in direct communication through passage 38 with passage 26 and brake cylinder pipe 23.

Mounted in the body 13 is a slide valve chamber bushing 41 formed on its lower face, as usual, with a seat for the slide valve 42. Sliding on the upper face of the slide valve is the quick service controlling valve 43, and sliding on the upper face of the quick service controlling valve is the graduating valve 44. The graduating valve 44 is mounted in a notch in the piston stem 45 and is positively actuated.

The quick service controlling valve is actuated by the stem 45 but being mounted in a notch 46 somewhat longer than the valve, has a limited lost motion. The triple slide valve 42 has lost motion relatively to the stem 45, being confined between the end guiding spider 47 and the collar 48. The lost motion of the slide valve 42 relatively to the piston stem 45 is greater than the lost motion of the quick service controlling valve 43.

Stem 45 is actuated by the usual triple piston 49 having a graduating button 51 and a piston ring of the snap type, as shown.

In Fig. 1 the piston 49 is shown in normal recharge position. The charging flow is through ports drilled in the bushing 52. All the air for charging flows through the charging port 53 and into the clearance space beneath the plug 54. In normal release position it then flows through the two ports 55 and 56. In restricted recharge and release position the piston 49 moves inwardly (to the right, Fig. 1) far enough to blank the port 55, reducing the bow to the capacity of the remaining port 56.

The movement to restricted recharge and release position is against the urge of the retard stop spring 57 which reacts against the retard stop plunger 58. This plunger 58 is mounted in a ported guide member 59 threaded to the inner end of the body 13, as clearly shown in the drawings. The member 59 carries a stop 61 which limits the inward motion of the slide valve 42. The retard stop 58 reacts against the stem 45 only, so that if the slide valve 42 is moved to restricted release position, it remains there and is not restored to normal release position by the retard stop 58.

Mounted in the front cap 31 is a plug nut 62 which guides a graduating stem 63. The graduating stem has a collar 64 which seats against the stop 65 and is urged against the same by a light graduating spring 66. Surrounding the stem 63 and also seating against 65 is a ring 67 having an internal flange 68. A heavy graduating spring 69 seats against the flange 68. As the piston 49 moves outward toward service position, it first arrives in the atmospheric quick service position of Fig. 6, and then moves further into engagement with the end of the stem 63. When it engages the stem 63, without compressing the spring 66, the parts are in chamber quick service position. The valve may move further to a full service position by overpowering the spring 66 until the collar 64 engages the flange 68.

In emergency position, Fig. 10, the piston overpowers both springs 66 and 69 and seats against the gasket 30 which is interposed between the body 13 and the front cap 31, as usual.

This being the mechanical construction of the valve, the porting can now be described.

There is a passage 71 which leads from the drip cup 33 and consequently from the brake pipe, to the space to the left of piston 49 and also to a port 72 in the seat of slide valve 42. This port 72 is the quick service port. Also formed in the seat for the slide valve 42 is a chamber port 73 which communicates by way of passage 74 with the quick service measuring chamber 24 in filler piece 18.

There are two exhaust ports 75, 76, each of which leads to a groove 77 extending around the bushing 41, and leading through a retainer pipe 78 to the retainer 79, which is normally open, but may be closed to retain pressure in the brake cylinders. The construction and function of retainer valves are both well understood, and various types of retainers may be used.

Also formed in the seat for the slide valve 42 is a brake cylinder port 81. This leads to the chamber 37 and thence by way of passages 38 and 26 to the brake cylinder pipe 23 which extends through the auxiliary reservoir to the brake cylinder.

There is one other port in the seat for the slide valve 42, namely, the supplemental reservoir port 82 which communicates through passage 28, connection 27, and pipe 29 with the supplemental reservoir 19.

The slide valve 42 is provided with a quick service port 83 which leads from the top of the valve to the bottom thereof, and terminates on the under face in an elongated recess so dimensioned and located that the port 83 communicates with port 72 in normal release position (Fig. 3) but not in restricted release position (Figs. 4 and 5), and communicates with port 72 in both quick service positions (Figs. 6 and 7), and quick service lap position (Fig. 8), but does not communicate with said port in emergency position (Fig. 10). There is also a through port 84 which extends from the top of the valve through to the bottom and terminates in the lower face in an elongated recess which freely connects ports 73 and 75 in normal release position (Fig. 3) and in restricted release position (Figs. 4 and 5) as well as in atmospheric quick service position (Fig. 6). In other positions of the slide valve it does not connect the ports 73 and 75. The recess produces a free connection between ports 73 and 75 while port 84 offers a relatively restricted communication with the brake pipe in atmospheric quick service (Fig. 6).

There is a third through port 85 which leads from the top of the slide valve 42 to the bottom thereof, and terminates in the lower face of an elongated recess which in normal release and atmospheric quick service, connects the ports 76 and 81 to offer a free exhaust from the brake cylinder. The port 85 is formed with a constriction at 86.

There is a supplemental reservoir port 87 which extends from the top face of the valve 42 to the lower face thereof and this registers with the port 82 in all release positions (Figs. 3, 4 and 5). It also registers therewith in atmospheric quick service position (Fig. 6) but at such time is blanked at its upper end.

The service port 88 leads from the top to the bottom of the slide valve 42. It registers with the service port 81 in chamber quick service position (Fig. 7) and also in full service position. It also registers in quick service lap position, at which time it is blanked, as will be described, and in the graduated service position assumed under brake pipe leakage (see Fig. 9).

There is an emergency port 89 which extends from the upper to the lower face of the slide valve 42. It is without function except in emergency position, in which position it registers with the brake cylinder port 81. At such time the slide valve 42 moves clear of the supplemental reservoir port 82.

The quick service controlling valve 43 is formed with a recess 91 which in different positions of the valve connects the port 84 either with the port 83 or with the port 85.

In restricted recharge and release (Fig. 4) it connects the ports 84 and 85 to afford a restricted exhaust from the brake cylinder to atmosphere. The same is true in normal recharge after restricted release (see Fig. 5). It connects the ports 83 and 84 in atmospheric quick service (Fig. 6) and in chamber quick service (Fig. 7). In quick service lap (Fig. 8) it connects the ports 84 and 85 to afford a restricted discharge from the quick service measuring chamber 24 to atmosphere. It assumes a similar position in graduated service by brake pipe leakage, but in such position is without any actual function because the measuring chamber will ordinarily have been vented in quick service lap position before the position of Fig. 9 is assumed.

The quick service controlling valve 43 is provided with a through port 92 which in all three release positions (Figs. 3, 4 and 5) registers with port 87 to permit charging of the supplemental reservoir. This port is devoid of function in all other positions of the parts.

There is a restricted service port 93 which leads from the top to the bottom surface of the quick service controlling valve 43. In the limiting right hand position of valve 43, relatively to valve 42, the port 93 registers with the port 88. Thus in quick service lap position (Fig. 8) when port 88 registers with brake cylinder port 81, the limited service port 93 is in position to supply auxiliary reservoir air to the brake cylinder and is then controlled by the graduating valve 44 which closes the port in quick service lap position but opens it in the position of Fig. 9 to afford a graduated service as a result of brake pipe leakage.

The valve takes the position shown in Fig. 9 only on a very gradual reduction of brake pipe pressure such as will occur when the engineer's brake valve is in lap position. If the engineer's brake valve operates to produce a definite brake pipe reduction, the valve will move to the chamber quick service position of Fig. 7, that is, the piston 49 will move to the left with sufficient force to shift the valve 43 on the valve 42. The graduating valve 44 not only controls the port 93 but it also controls the port 92, and it will be observed that in normal recharge, after restricted release (Fig. 5) it partially obstructs the port 92.

Operation

Normal recharge and release (Fig. 3)

During release, on all cars except those at the front of the train, brake pipe pressure will rise gradually. The piston 49 of the triple valve will move in until its stem 45 engages the retard stop 58, at which time it will be arrested because of its inability to overcome the spring 57. The valve parts will therefore be positioned as shown in Fig. 3. The charging flow around the piston occurs at a relatively rapid rate, because both the ports 55 and 56 are open. Air will flow from the brake pipe to the chamber within the slide valve bushing 41 and thence directly to the auxiliary reservoir and to the supplemental reservoir through the ports 92, 87 and 82. The brake cylinder will be exhausted at a rapid rate by way of the ports 81, the enlarged recess at the lower end of the port 85 and the port 76. The measuring chamber 24 will be exhausted to atmosphere by way of ports 73, the enlargement at the lower end of the port 84 and the port 75.

It will be observed that should the retainers be set the brake cylinder pressure and the pressure in the measuring chamber 24 would both be held at the retained value.

*Restricted recharge and release (Fig. 4)*

On the cars at the forward end of the train, the rise of brake pipe pressure is much more rapid so that the piston 49 overpowers the spring 57, the piston moving inward to position the valves as shown in Fig. 4. In this position charging flow from the brake pipe to the slide valve chamber is limited to the capacity of the port 56. Flow from the slide valve chamber to the supplemental reservoir occurs as described in normal release. The brake cylinder is exhausted at a restricted rate by way of the ports 81, 85, (the flow being through the restriction 86) recess 91 and port 84. The measuring chamber 24 is exhausted as described in normal release.

*Normal recharge after restricted release (Fig. 5)*

After an interval the pressure differential between brake pipe and auxiliary reservoir will diminish and the retard stop spring 57 will restore the piston 49 to normal recharge position. In doing so it merely shifts the piston and the graduating valve 44. The slide valve 42 and the quick service controlling valve 43 remain in the position of restricted recharge and release. The graduating valve slightly covers the port 92. Although the charging flow rate is restored, the rate of the exhaust to the brake cylinder is not affected but remains restricted. In this way the entire system will become charged and the reservoir and brake pipe pressures will equalize while the brake cylinders will be completely exhausted. If retainers were applied, the pressures would be retained in the brake cylinder and the quick service measuring chamber, just as described with reference to normal recharge and release.

It should be observed that in all three recharge and release positions the enlarged cavities of the exhaust ports in the face of the slide valve are connected to atmosphere (unless retainers are on) so that the slide valve is loaded and its frictional resistance to motion is increased by the pressure differential holding it to its seat.

*Atmospheric quick service (Fig. 6)*

Assume now that the engineer reduces brake pipe pressure at a service rate. Piston 49 will move outward (to the left). If the parts are in the normal recharge and release position of Fig. 3, the triple valve will reach the atmospheric quick service position of Fig. 6 merely by motion of the graduating valve 44 and the quick service controlling valve 43, but if the triple valve is in the position of normal recharge after restricted release (Fig. 5) the slide valve 42 must also be moved. Inasmuch as the slide valve 42 is loaded, as above explained, motion toward atmospheric quick service position (Fig. 6) from the normal release position after restricted recharge (Fig. 5) is resisted by the friction of the slide valve 42.

It follows from this that the valves near the forward portion of the train are stabilized against motion toward atmospheric quick service position because the loaded slide valve must be moved, while those farther to the rear of the train are not so stabilized, but move quite freely because only the quick service controlling valve and graduating valve must be moved. This reduces the risk that an erratic feed valve will initiate quick service.

When the parts reach atmospheric quick service position (Fig. 6) the brake pipe port 72 is connected by way of the port 83, recess 91 and port 84, with the exhaust port 75. Consequently, the brake pipe is vented directly to atmosphere. At the same time brake pipe pressure acts on the lower face of the valve in the extensions at the lower end of the ports 83 and 84, and to a degree unloads the valve 42, so that it moves more freely than it did in the release positions. It will be observed that the measuring chamber 24 is still connected to the atmospheric port.

If retainers are on, quick service flow (in Fig. 6) will be to the retainer pipe and to the measuring chamber 24, acting as a combined volume. It follows that if retainers are set the drop produced in quick service is less violent than it otherwise would be, a condition which accords well with the fact that the brakes are already partially applied and the slack is bunched.

*Chamber quick service (Fig. 7)*

The atmospheric quick service of Fig. 6 will persist long enough to insure continued motion outward of the triple piston so that it will arrive in the chamber quick service position of Fig. 7. In this position the port 72 is connected by the port 83, recess 91 and port 84, with the quick service measuring chamber port 73, and disconnected from the atmospheric port 75. Consequently the chamber 24 will be gradually charged by flow from the brake pipe and the rate of venting flow will diminish as the pressure in the measuring chamber rises. In this way the venting flow is tapered off and there is a minimum tendency toward the production of surging or wave action in the brake pipe.

The brake cylinder remains connected to the atmosphere in the atmospheric quick service position (Fig. 6) but this connection is terminated in chamber quick service position (Fig. 7). At such time the service port 88, which is exposed at its upper end by the leftward movement of the quick service controlling valve 43, registers with brake cylinder port 81. Thus flow to the brake cylinder from the auxiliary reservoir occurs and will continue even though the piston 59 should overpower the light graduating spring 66.

Flow from the auxiliary reservoir to the brake cylinder will result in such reduction of auxiliary reservoir pressure that the piston 49 will move inward (to the right) under preponderating brake pipe pressure. In this motion graduating valve 44 moves to lap the restricted service port 93 in the controlling valve, after which the quick service controlling valve is shifted to bring the restricted service port 93 into register with service port 88, and at the same time to cause port 91 to bridge ports 84 and 85. The effect is to vent the quick service measuring chamber 24 to atmosphere through the restriction 86, and also to load slide valve 42 and controlling valve 43 because of the substantial areas of the vented cavities in these valves. Thus loading resists overtravel.

It will be observed that if retainers are applied, the retained degree of pressure will be held in the chamber 24.

*Quick service on brake pipe reductions after the initial reduction*

If now the engineer initiates another brake pipe reduction at the engineer's brake valve, the piston 49 will move outwardly (to the left) and the parts will return to the chamber quick service position of Fig. 7, without passing through the atmospheric quick service position of Fig. 6. Consequently, the brake pipe port 72 is connected with the measuring chamber port 73 by way of 83, 91, 84. Thus while there is quick service venting, it is limited to the capacity of the measuring chamber 24.

This ability to repeat quick service venting with each successive brake pipe reduction, and to hold the amount vented to a safe value, permits rapid graduation of the brakes in application. It avoids the risk (heretofore attendant upon the use of active quick service venting) that the venting would cause wave action and the wave action cause repeated venting thus initiating a vicious circle leading to an undesired full equalized application.

It will be observed that if retainers are applied at this time, they will operate to retain the charge in the measuring chamber 24, but when the valves are moved to release position, these charged volumes will be in connection with the brake cylinder.

*Graduated service by brake pipe leakage (Fig. 9)*

From quick service lap the triple valve may move to a graduating position induced by brake pipe leakage while the engineer's brake valve is lapped. If the engineer leaves his valve in lap position, and if there is a normal amount of brake pipe leakage, piston 49 will move outward (to the left) from quick service lap position (Fig. 8). It will be observed that in quick service lap position the lower ends of the ports 84 and 85 are at atmospheric pressure, so that the slide valve 42 is quite heavily loaded and the valve 43 is somewhat loaded by cavity 91. Quick service controlling valve is also loaded since the space 91 is subject to atmospheric pressure. Consequently, when the piston 49 moves outward from quick service lap position, provided it moves at a relatively slow rate as it would in a brake pipe reduction caused by leakage, the piston will shift only the graduating valve 44 and will be arrested when the stem 45 engages the quick service controlling valve 43. This will position the parts as shown in Fig. 9, in which the restricted service port 93 allows a very slow flow to the brake cylinder. This flow is so restricted that it will keep pace merely with the maximum permissible rate of reduction of brake pipe pressure by leakage alone. Should auxiliary reservoir pressure fall faster than brake pipe pressure under such conditions the valve would graduate back to quick service lap position (Fig. 8).

*Emergency position (Fig. 10)*

Upon a sudden reduction of brake pipe pressure, which, it will be understood, is initiated at the engineer's brake valve, or elsewhere, and intensified and propagated throughout the length of the brake pipe by the emergency vent valves 16, piston 49 will move to its extreme leftward position and seat on the grasket 30. At such time the parts assume the position shown in Fig. 10 in which port 82 is exposed by the valve 42 and the port 89 registers with brake cylinder port 81. Consequently both auxiliary reservoir air and supplemental reservoir air flow through the port 81 to the brake cylinder.

So far as the quick service function of the valve 5 is concerned the supplemental reservoir 19 and the ports which control it, may be omitted. While I prefer to form the measuring chamber in the filler piece interposed between the triple valve and the auxiliary reservoir, other constructions may be adopted.

It is not essential that emergency venting be carried out in any particular way, and the present invention might be incorporated in valves which produce emergency venting in any of the various ways known in the art.

There are distinct advantages, as stated, in causing the atmospheric service venting and the exhaust to the measuring chamber to take place through the main exhaust to the triple valve, so that they may be controlled by the retainer, but the advantage of successively venting to atmosphere and to a closed chamber and the advantage of subsequent venting to the chamber only may be secured irrespective of this arrangement. Except as stated in the claims the present invention is not limited in this regard.

While I have described such features as the graduating stem and retard stop in detail, other arrangements are known and can be availed of in cooperation with the valve features herein disclosed, and no limitation is implied to the specific arrangements selected for illustration.

While I prefer to superpose the graduating valve on the quick service controlling valve, this is not strictly necessary. The most useful characteristics of the valve arise from the fact that there are two valves capable of moving differentially with respect to the slide valve while the slide valve remains at rest. Equivalent results can be secured without superposing the third valve on the second; for example, the second and third valves may be mounted on the slide valve. The broader claims are drawn with the intention of covering such arrangements.

The triple valve as described in the present application discloses certain features which are not here claimed but are reserved for prior applications. Control of flow between the reservoirs by the slide and graduating valve forms a part of the claimed subject matter of Patent No. 1,928,091, and Patent No. 2,023,757, and the second of these two patents contains claims based on the position called normal recharge after retarded release. Certain features relating to loading of the slide valve are more broadly claimed in Patent No. 2,013,743, while the arrangement for preventing creep from lap to quick service, and certain details of the quick service vent to a chamber are broadly claimed in application Serial No. 593,635, filed February 17, 1932.

What is claimed is:

1. The combination with a triple valve including a triple piston and a slide valve, of a measuring chamber; and two service venting means, controlled at least in part by said slide valve, and arranged to act serially to vent the brake pipe, the first-acting of said venting means causing flow to atmosphere, and the second causing flow to said measuring chamber, the parts being so arranged that the first flow terminates before the triple valve reaches service position, and the second flow commences substantially as the triple valve reaches a position at which flow to the brake cylinder commences, there being ports controlled by said slide valve for venting said chamber in a lap position.

2. The combination of claim 1, further characterized in that the triple valve has a brake cylinder exhaust port controlled by a retainer, and the venting flow from the brake pipe and the venting of the measuring chamber both occur through said brake cylinder exhaust port.

3. The combination with a triple valve including a triple piston, a slide valve, and an associated quick service controlling valve movable relatively to each other by lost motion of the piston with respect to at least one of said valves; of a measuring chamber; an exhaust port; a quick service port; and ports in said slide valve and quick service controlling valve operative as the piston moves toward service position, first to connect the quick service port and the measuring chamber with the exhaust port, and then to disconnect them from the exhaust port while maintaining the connection between said quick service port and said measuring chamber, the parts being so arranged that as the triple piston returns under falling auxiliary reservoir pressure, it shifts the controlling valve the slide valve at rest, such shifting serving to disconnect the quick service port from the measuring chamber and to connect the measuring chamber with the exhaust port, said exhaust port being the brake cylinder exhaust port of the triple valve and being controlled by a retainer.

4. In a triple valve, the combination of a triple piston; a triple slide valve actuated by said piston with lost motion; a quick service controlling valve coacting with said slide valve and actuated by said piston; and a measuring chamber, the parts being so arranged and the valves so ported that the slide valve remains at rest while the controlling valve moves from a release position to a quick service position in which brake pipe air is vented to atmosphere, and both valves then move to a service position in which the brake pipe is connected to said chamber, the slide valve thereafter remaining at rest while the controlling valve moves back to a lap position in which said chamber is disconnected from the brake pipe and vented.

5. The combination of a triple piston, a triple slide valve actuated thereby and having lost motion relatively thereto; a yielding retard stop resisting motion of said piston to restricted release and recharge position, and serving to restore the piston to normal recharge position without affecting the slide valve, said slide valve opening in normal release position and closing in restricted release position a quick service vent passage; and valve means also controlling said quick service passage, and actuated by motion of said piston relatively to said triple slide valve.

6. The combination with a triple valve including a triple piston, a quick service controlling valve actuated thereby, and a slide valve also actuated by the piston, said triple valve having a normal release position and a restricted release position from which last position the piston returns upon approach to equalization between auxiliary reservoir and brake pipe pressures; of a stabilizing device including ports controlled by said controlling valve and serving to load the slide valve when the controlling valve starts to service position with the slide valve in restricted release position, and a quick service port in the slide valve effective in normal, but not in restricted release position of the slide valve and subject to control by the controlling valve, the parts being so arranged that the friction of the slide valve stabilizes against motion to quick service position those slide valves which have moved to restricted release position.

7. The combination with a triple valve including a triple piston, a quick service controlling valve, and a slide valve, said triple valve having a normal release position and a restricted release position, from which last position the piston returns upon approach to equalization between auxiliary reservoir and brake pipe pressures; of a stabilizing device including ports controlled by said controlling valve and serving to load the slide valve when the controlling valve starts to service position with the slide valve in restricted release position, and a quick service port in the slide valve, effective in normal, but not in restricted release position of the slide valve and subject to independent control by the controlling valve, the parts being so arranged that the friction of the slide valve stabilizes against motion to quick service position those slide valves which have moved to restricted release position; and a third valve actuated by motion of said piston relatively to said slide valve and controlling a restricted service port.

8. The combination of claim 7 in which the restricted service port leads through the quick service controlling valve.

9. A triple valve including a triple piston, a slide valve, a quick service controlling valve and a graduating valve, said valves being relatively shiftable by said piston with differential lost motion; said triple valve having a service position and a lap position between which the controlling valve moves relatively to the slide valve, said triple valve establishing in its lap position a restricted service passage controlled by motion of the graduating valve relatively to the other valves.

10. A triple valve including a triple piston, a slide valve, a quick service controlling valve and a graduating valve, said valves being relatively shiftable by said piston with differential lost motion, said valves having a service position and a lap position between which the controlling valve moves relatively to the slide valve, said slide and controlling valve conjointly establishing in said lap position a restricted service passage controlled by motion of the graduating valve relatively to the controlling valve.

11. A triple valve including a triple piston, a slide valve, a quick service controlling valve and a graduating valve, said valves being relatively shiftable by said piston with differential lost motion; said slide and controlling valves having a service position in which a relatively large port to the brake cylinder is exposed by the controlling valve, and a lap position in which the controlling valve overlies said port and places a restricted port in register therewith, said restricted port being controlled by motion of said graduating valve relatively to said controlling valve.

12. A triple valve including a triple piston, a measuring chamber, a slide valve, a quick service controlling valve, and a graduating valve, said valves being relatively shiftable by said piston with differential lost motion; said valves having a service position in which a relatively large service port is open and a lap position, between which service and lap position the controlling valve moves relatively to the slide valve to connect the measuring chamber selectively with the brake pipe and an exhaust, said valves affording in lap position a restricted service passage controlled by relative motion of the graduating valve.

13. The combination of claim 12 further characterized in that the triple valve is provided with a charging port for a supplemental reservoir controlled by the graduating valve.

14. The combination of claim 12, further characterized in that the triple valve is provided with a charging port for a supplemental reservoir controlled by all three valves.

15. The combination of claim 12, further characterized in that the frictional resistances of the valves to motion are so chosen that the triple piston will respond to a reduction of pressure caused by brake pipe leakage to move the graduating valve but not the quick service controlling valve.

16. A triple valve including a triple piston, a quick service measuring chamber, a slide valve, and a quick service controlling valve, said valves being so ported and so operatively connected with said piston that both valves move toward service position and connect the brake pipe first to atmosphere, until the slide valve has moved part way, and then to the measuring chamber, as the slide valve completes its motion; that the controlling valve moves relatively to the slide valve from service to lap position and through such motion connects the measuring chamber to exhaust after disconnecting it from the brake pipe; and that on a succeeding brake pipe pressure reduction the controlling valve shifts relatively to the slide valve terminating the chamber vent and connecting the chamber again with the brake pipe.

17. The combination of claim 16, further characterized in that the triple valve has a brake cylinder exhaust passage controlled by a retainer, and the flow from the brake pipe in quick service, and from the measuring chamber in lap position, occurs to such exhaust passage.

18. A triple valve, comprising in combination a triple piston; a slide valve; a quick service controlling valve; and a graduating valve, said valves being movable relatively one to another by motion of said triple piston; said triple valve having a lap position and two service application positions in all of which the position of the slide valve remains substantially unchanged, the service positions being differentiated by the rapidity of flow from auxiliary reservoir to brake cylinder, and both such flows being graduated, one by motion of the controlling valve and the other by motion of the graduating valve.

19. A triple valve, comprising in combination, a triple piston; a slide valve with seat; a quick service controlling valve; and a graduating valve, said three valves being movable by said piston with differential lost motion, said triple valve having a lap position and two service positions in all of which the slide valve remains substantially at rest with a service port in register with a brake cylinder port in the seat, and said controlling valve having a restricted service port which in one service position registers with the service port in the slide valve, said restricted service port being controlled by said graduating valve, said triple valve mechanism affording rapid service flow to the brake cylinder when said controlling valve exposes the service port in the slide valve and restricted service flow to the brake cylinder when said restricted port in the controlling valve registers with the service port in the slide valve and is exposed by said graduating valve.

20. A triple valve, comprising in combination a triple piston; a slide valve; a controlling valve; and a graduating valve, said valves being movable by said piston with differential lost motion; the parts being so arranged that the controlling valve acts to graduate a rapid service flow through the slide valve, and the graduating valve operates to graduate a restricted service flow through the controlling valve and slide valve in series.

21. A triple valve, comprising in combination a triple piston; a slide valve; a controlling valve; and a graduating valve, said valves being movable by said piston with differential lost motion; the parts being so arranged that the controlling valve acts to graduate a rapid service flow through the slide valve and to establish a quick service vent passage from the brake pipe, and the graduating valve operates in one position of the controlling valve to graduate a restricted service flow through the controlling valve and slide valve in series, the quick service vent passage being then closed by said controlling valve.

22. A triple valve, comprising in combination a triple piston; a slide valve; a controlling valve; and a graduating valve, said valves being movable by said piston with differential lost motion; the parts being so arranged that the controlling valve acts to graduate a rapid service flow through the slide valve and to establish a quick service vent passage from the brake pipe to a measuring chamber, and the graduating valve operates in one position of the controlling valve to graduate a restricted service flow through the controlling valve and slide valve in series, the quick service vent passage being then closed by said controlling valve.

23. A triple valve, comprising in combination a triple piston; and a plurality of valves of the slide type movable by said piston with differential lost motion, said valves being so ported that as they shift from release position to application position they pass through two quick service positions in the first of which the brake pipe is vented to atmosphere and in the second of which the brake pipe is vented to a measuring chamber, said valve having a lap position to which the valve is moved from service position, in which lap position said measuring chamber is vented, and from which lap position the valve may move back toward service position upon a subsequent reduction of brake pipe pressure, the valves in such motion passing through the second-named quick service venting position only.

24. A triple valve, comprising a triple piston; a slide valve; a controlling valve; and a graduating valve, the controlling valve coacting with the slide valve under a normal service reduction of brake pipe pressure to graduate service flow to the brake cylinder, and the graduating valve coacting with the controlling valve to graduate restricted service flow to the brake cylinder as the result of brake pipe leakage when the controlling valve is in lap position.

25. A triple valve, comprising a triple piston; a slide valve; a controlling valve; and a graduating valve, the controlling valve coacting with the slide valve under a normal service reduction of brake pipe pressure to graduate service flow to the brake cylinder and to control quick service venting of the brake pipe, and the graduating valve coacting with the controlling valve to graduate restricted service flow to the brake cylinder as the result of brake pipe leakage when the controlling valve is in lap position.

26. A triple valve, comprising a triple piston; a slide valve; a controlling valve; and a graduating valve, the controlling valve coacting with the slide valve under a normal service reduction of brake pipe pressure to graduate service flow to the brake cylinder, and the graduating valve coacting with the controlling valve in lap position and as the result of brake pipe leakage to graduate restricted service flow to the brake cylinder, and in a release position to control communication with a supplemental reservoir.

27. A triple valve, comprising a triple piston; a slide valve; a controlling valve; and a graduating valve, the controlling valve coacting with the slide valve under a normal service reduction of brake pipe pressure to graduate service flow to the brake cylinder and to control quick service venting of the brake pipe, and the graduating valve coacting with the controlling valve in lap position and as the result of brake pipe leakage to graduate restricted service flow to the brake cylinder and in a release position to control communication with a supplemental reservoir.

28. In a triple valve, the combination of a triple piston, a slide valve, a controlling valve, and a graduating valve, said three valves being actuated by the triple piston with differential lost motion, the graduating valve having a greater range of motion than the controlling valve relatively to the slide valve, said triple valve having a service position and a lap position between which the slide valve is not shifted and the graduating valve and controlling valve shift differentially, said slide valve having a service port through which a restricted flow is graduated by the graduating valve on initial motion from lap toward service position, and through which a larger flow is graduated by the controlling valve upon further motion from lap toward service position.

29. In a triple valve, the combination of a triple piston, a slide valve, a controlling valve, and a graduating valve actuated by said piston with differential lost motion, in such manner that as the piston reverses its motion first the graduating valve and then the controlling valve are put in motion, said triple valve having a service position and a lap position between which the slide valve does not shift and the slide valve having a quick service port and a service port, each of which is then in operative position, the valves being so arranged that upon initial motion from lap toward service position, motion of the graduating valve controls a restricted flow through said service port while the quick service port remains closed, and upon further movement the controlling valve moves, opens the quick service port and graduates a more rapid flow through said service port.

30. A triple valve comprising in combination a triple piston; a slide valve; and a plurality of graduating valves shiftable relatively thereto, said valves being actuated by said piston, the valves being so ported as to offer, in different positions, different graduated service flow paths of different maximum capacity, the service flow path of smaller maximum capacity being opened by initial motion from lap position.

31. A triple valve comprising in combination a triple piston; a slide valve; and a plurality of graduating valves shiftable relatively thereto, said valves being actuated by said piston, the valves being so ported as to offer, in different positions, different graduated service flow paths of different maximum capacity, said service flow paths being graduated by different graduating valves.

32. A triple valve comprising in combination, a triple piston; a slide valve; and a plurality of graduating valves shiftable relatively thereto, said valves being actuated by said piston, one of said graduating valves controlling quick service venting flow, the valves being so ported as to offer in different positions graduated service flow paths of different maximum capacity, the flow path of the smaller maximum capacity being opened by initial motion from lap position while the quick service passage is closed by said graduating valve.

33. A triple valve comprising in combination, a triple piston; a slide valve; and two graduating valves shiftable relatively thereto, said valves being actuated by said piston, one of said graduating valves controlling a service port and a quick service vent port, and the other of said graduating valves controlling a service port of small capacity, the last-named valve serving to open said small capacity service port upon initial motion from lap position while the first-named valve closes its service port and the quick service vent port.

34. A triple valve comprising in combination a triple piston; a slide valve; and a plurality of graduating valves shiftable relatively thereto, said valves being actuated by said piston, the valves being so ported that one of said graduating valves controls quick service venting flow and another of said graduating valves controls service flow to the brake cylinder through a relatively restricted port and opens such port on motion from lap position, while the quick service port remains closed by the first-named graduating valve, said valves being further provided with ports for establishing a more rapid graduated flow to the brake cylinder while the first-named graduating valve opens said quick service port.

35. The combination of a triple valve comprising a triple piston; a slide valve; and a plurality of graduating valves movable relatively to the slide valve, said valves being actuated by the piston, and means comprising ports in said valves for causing one of said graduating valves to open and close a quick service port and for graduating two service flow paths to the brake cylinder while the slide valve remains at rest, said service flow paths being of different maximum capacity and being graduated by at least one of said graduating valves, the smaller of said passages being graduated while the quick service passage is closed and the larger of said passages being graduated while the quick service passage is open.

36. In a triple valve, the combination of a triple piston; a triple slide valve actuated by said piston with lost motion; a quick service controlling valve coacting with said slide valve and actuated by said piston; and a measuring chamber, the parts being so arranged and the valves so ported that the slide valve remains at rest while the controlling valve moves from a release position to a quick service position in which brake pipe air is vented to atmosphere, and both valves thereafter move to a service position in which the brake pipe is connected to said chamber, such motion of the slide valve serving to close said vent to atmosphere.

37. The combination with a triple valve including a triple piston, a slide valve, and an associated quick service controlling valve movable relatively to each other by lost motion of the piston with respect to at least one of said valves: of a measuring chamber; an exhaust port; a quick service port; and ports in said slide valve and quick service controlling valve operative as the piston moves toward service position, first to connect the quick service port and the measuring chamber with the exhaust port, and then by motion of the slide valve to disconnect them from the exhaust port while maintaining the connection between said quick service port and said measuring chamber, the parts being so arranged that as the triple piston returns under falling auxiliary reservoir pressure, it shifts the controlling valve leaving the slide valve at rest, such shifting causing the controlling valve to disconnect the quick service port from the measuring chamber, and after such disconnection to connect the measuring chamber with exhaust.

CHARLES A. CAMPBELL.